United States Patent Office 3,540,993
Patented Nov. 17, 1970

3,540,993
SPUTTERING APPARATUS
Joseph Gerard Wurm, Varese, Pierre Beucherie, Biandrono, Varese, and Michel Block, Cocquio, Varese, Italy, assignors to European Atomic Energy Community (Euratom), Brussels, Belgium
Filed Sept. 16, 1966, Ser. No. 579,917
Claims priority, application Belgium, Dec. 17, 1965, 21,744
Int. Cl. C23c *15/00*
U.S. Cl. 204—298    10 Claims

ABSTRACT OF THE DISCLOSURE

A method and apparatus for depositing a thin layer of at least partially conducting material on a body and comprising maintaining the body in a low pressure gaseous atmosphere, feeding gas into the atmosphere while maintaining the low pressure and applying a high-frequency voltage to a coil or electrode pair located within the atmosphere and adjacent both the body and feeding means to produce a high-frequency electromagnetic field for ionization of the gas.

---

The invention relates to a process and a device for depositing on surfaces of all kinds coats of metals or alloys (intermetallic compounds), graphite and all types of conductors or partial or semiconductors. These coats may cover metal, ceramic or plastics surfaces, in the form of non-corrosive protective layers or in the form of a diffusion barrier inside or outside any object, or form electrically conductive or heat-conducting coatings, or coats applied for the purpose of decoration or their appearance. It is possible in carrying out the invention to apply coatings which are conductive or which are compounds not necessarily themselves conductive but having at least one conductive component.

The physico-chemical properties desirable for these coats may be as follows: good adhesion; uniformity of deposit; homogeneity of deposit; very low porosity (impermeability to gases or liquids); very fine granular structure; and good resistance to corrosion. It does not of course follow that the coats necessarily have all these properties.

The following examples of existing methods for depositing material may be mentioned; electrodeposition, and deposition by the thermal dissociation of chemical products, evaporation, rolling or pressing.

The invention may be classed as an example of deposition by electrical discharges, which, in the present stage of the art, includes in particular cathode sputtering. The following is a brief description of this process. A low-pressure atmosphere of argon gas, or some other gas, for example helium, of 1 mm. to $10^{-1}$ mm. Hg is produced in a vacuum enclosure, e.g. a bell glass. Two electrodes are generally disposed in this enclosure; the cathode is made of the material to be deposited and the anode is generally formed by the enclosure of the apparatus, although an auxiliary anode or the article to be coated may be used. A high voltage of about 2,000 to 4,000 volts is established between these two electrodes. The sample to be coated is disposed opposite the cathode.

The exact mechanism of conventional cathode sputtering is not yet very well known or explained. However, the following description may be given.

The cathode emits electrons which ionise the gas, for example argon, by collision. The resulting argon ions are accelerated by the high-voltage field and bombard the cathode so that microparticles of the cathode are torn off and hurled all over the enclosure, including the surface of the article. Apparatus that operate on this principle and even incorporate some improvements with respect to the above elementary description are commercially available at the present time. An apparatus with the following features may be mentioned as an example. The cathode is heated indirectly but it is not made of the material to be deposited. A second auxiliary cathode, which is made of the material to be deposited, is placed opposite the article to be coated. A negative voltage is also applied to the second cathode, but this is lower than that of the heating cathode. The ionised gases are concentrated in the centre of the glass by a 200 gauss magnetic field.

Cathode sputtering, which is satisfactory for the deposition of extremely thin coats, nevertheless has several disadvantages. These include: too low an output for deposits of some size; too low a speed of deposition; difficulty of adapting the electrode system for working efficiently in a pipe, for example, to coat the inside of it, and lack of mobility of the device as a whole, which is very unsuitable for depositing material in industrial apparatus of some size.

In the process according to the invention which reduces these disadvantages and also enables materials with a high melting point to be deposited, instead of using an electrostatic field, a high-voltage and very high frequency electromagnetic field is used. According to this process, the surface to be coated is immersed in a gaseous atmosphere which is constantly renewed and kept at a substantially constant low pressure (e.g. between about $10^{-1}$ and $10^{-3}$ mm. Hg) this gas being subjected to a high-voltage, high-frequency electromagnetic field by application means that are immersed in the gaseous atmosphere and are made at least in part of the material to be deposited or one of its components, so as to ionise the gas and convert it, at least in part, into plasma, whose particles, owing to their agitation, strike the means or part thereof aforesaid for the application of the high-voltage, high-frequency field and tear off them, as a result of the shock produced, small particles of material which, according to whether the gas is inert or reactive, are deposited unchanged or after combination with the gas on the surface to be coated, which is preferably disposed in the immediate proximity of the means for applying the high-frequency field.

The invention will now be described in more detail with reference to the attached drawings, in which elements that are identical or carry out identical functions are indicated by the same reference numbers. In these drawings:

FIGS. 4a to 4h show different arrangements of inductive means for the application of the high-frequency field.

Figure 1:
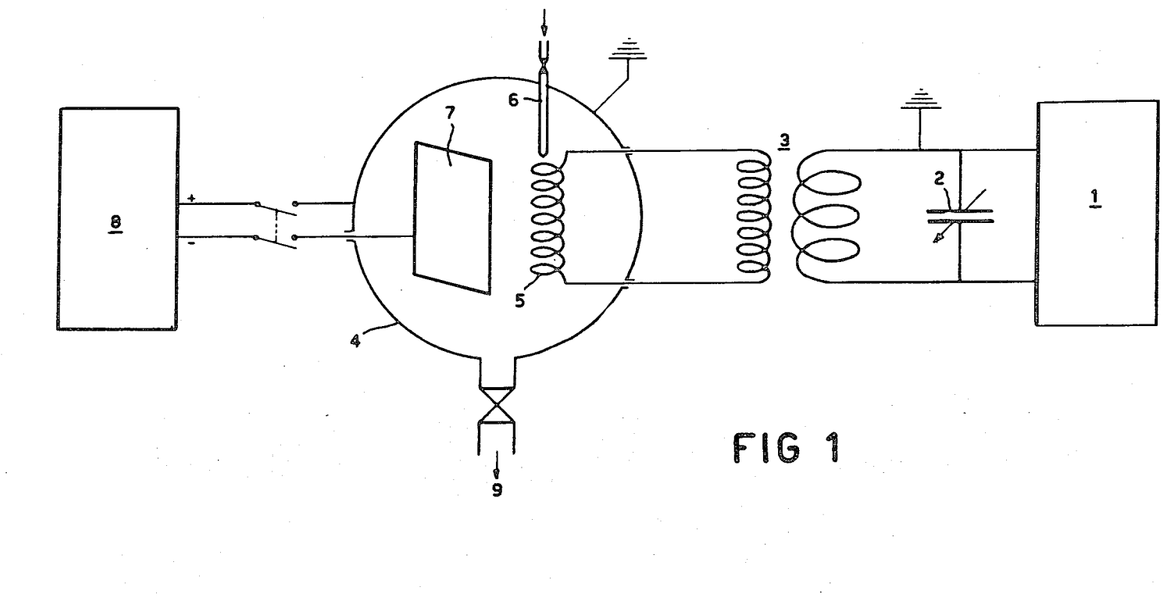
FIG. 1 is a general diagram of one example of the apparatus.
Figure 2:
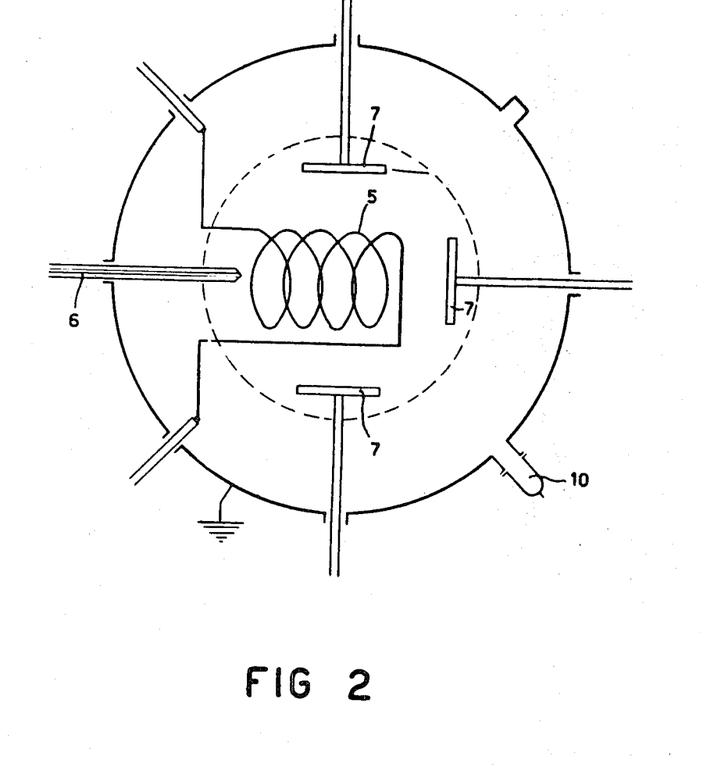
FIG. 2 is a diagram of the sputtering chamber.

FIGS. 1 and 2 show a high-frequency generator 1, whose frequency can be varied from 2 to at least 30 m.c./s. by means of a variable capacitor 2. A step-up transformer 3 transmits the high-frequency current delivered by the generator to a coil 5 made of the material to be projected and situated in a low-pressure enclosure 4. The high frequency current is filtered so as to eliminate any spurious modulations. A conduit 6 for conveying gas at low pressure is disposed preferably so as to inject the gas into the space within the turns of the coil 5. A vacuum-pump system 9 keeps the low gas pressure in the enclosure 4 substantially constant. The or each article to be coated 7 is disposed opposite the coil and 3 or 4 cm. away from it. Generally (see FIG. 1) the conductive samples to be coated are supported and connected electrically to an electrode which passes through the wall of the enclosure and is insulated from it, as are the power leads to the coil 5. The negative pole of a high-voltage direct-current generator 8 is connected to the sample to be coated, the positive pole being connected to the wall of the enclosure 4. This arrangement enables the sample to be cleaned, before deposition, "in situ" by a process similar to prior-art cathode sputtering. In this arrangement, the article to be cleaned acts as a cathode from which material is removed. This high-voltage apparatus is, of course, disconnected during the deposition phase.

An important point regarding the introduction and pressure of the gas must be emphasized. To create optimum sputtering conditions, a small gas jet is introduced directly into the axis of the coil.

The apparatus works as follows. Owing to the high-frequency electromagnetic field, the gas introduced into the space bounded by the coil ionises intensively and forms a plasma. The particles of this plasma, owing to their agitation, are flung against the coil and tear off it particles of the material of which it is made. These particles spread all over the enclosure and are deposited, inter alia, on the article 7 to be coated. A great advantage of the above-described process and apparatus is that the speed of deposition is much greater than with cathode sputtering. It has also been found by experiments that the plasma formed from the gas is kept substantially within the coil. The gas pressure outside the coil is therefore inevitably very much lower and corresponds to some extent with the pressure measured by the vacuum-measuring instruments ($10^{-1}$ to $10^{-3}$ mm. Hg.) placed in the enclosure. This low gas pressure surrounding the sample is advantageous for the structure of the deposit. For the low pressure results in less occlusion of gases in the deposit. The variable capacitor 2 is used to vary the frequency of the electromagnetic field created by the coil. Each gas used has a preferential ionisation frequency, and it is therefore advantageous to be able to adapt the frequency of the field to the type of gas used.

If the or each sample to be coated is not conductive, it or they can be disposed circumferentially round the coil 5, without any kind of electrical connection (see FIG. 2). A vacuum-measuring gauge 10 may be included. The mass of the enclosure is grounded.

An apparatus of this kind has been used, for example, to form the following deposits: nickel on Zircaloy, nickel on ceramics, niobium on copper, niobium on ceramics ($Al_2O_3$), tantalum on ceramics ($Al_2O_3$), iron on copper, nickel on copper, niobium on brass, niobium on Zircaloy, and tungsten on ceramics. A crucible has been coated with tungsten and has then been used for the fusion of metallic uranium without oxidation of the metal. Stainless steel has also been deposited. Fe-Ni-Cr has been conveyed unchanged from the coil to the article to be coated.

The above are only a few examples, and the list given is not restrictive. Generally, the operational technical data vary little from one sample to another.

The depositing time depends on the nature of the metal and the power obtained from the generator. The amount deposited per minute per cm.$^2$ can be increased by increasing the number of windings and arrival points of ionising gas. The speed of deposition can be increased in another way. This is to superimpose conventional cathode sputtering on the process taking place in the above-described apparatus. All that is required is to set up an intense continuous electric field between the coil 5 and the enclosure 4, this field being superimposed on the electromagnetic field. Any improvements of this technique may also be used.

The examples just mentioned relate to the deposition on the sample of the material of which the coil 5 is made, by using pure or mixed, not very reactive gases. But the invention is not limited to this example of its use. Without departing from the scope of the invention, deposits can be obtained of compounds comprising the material of the coil 5 and the gas, which is reactive in this case, injected in the vicinity of the coil. Aluminium oxide and niobium nitride have been deposited in this way. The coil 5 was then made of aluminium or niobium and the gaseous atmosphere of oxygen or nitrogen. In the case of deposits of compounds, of course, the above list is not exhaustive and has only been given by way of example. A mixture of several reactive and/or inert gases can be used this way.

Figure 3A:
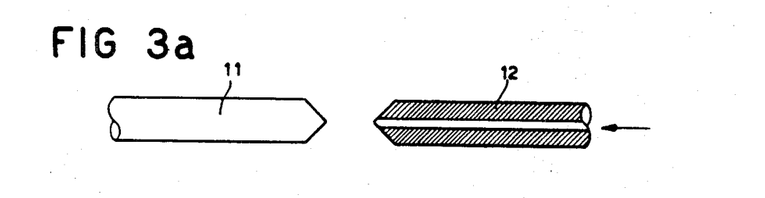
FIGS. 3a, 3b, 3c and 3d show different arrangements of capacitive means for applying the high-frequency field.

Furthermore, the example given in the general description, in which the means for applying the high-frequency field are in the form of a coil, is not restrictive. There are several other ways of forming these means. The following are a few examples:

(1) Two coaxial cylindrical electrodes 11 and 12 opposite one another with an ionising gas inlet channel in the hollow axis of one of the electrodes (FIG. 3a).

Figure 3B:
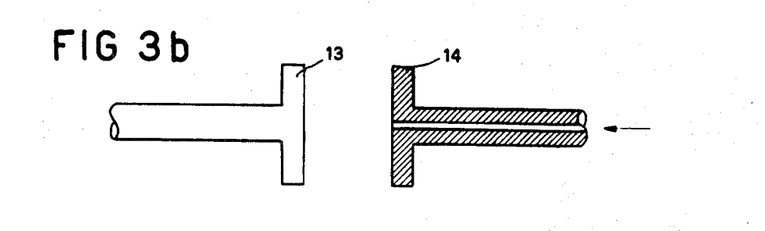
Figure 3C:
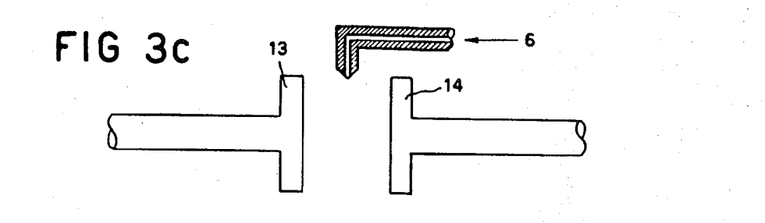

(2) Two coaxial plane electrodes 13 and 14 disposed opposite one another with the gas inlet either in the center of one of the electrodes (FIG. 3b) or at the side or periphery (FIG. 3c).

Figure 3D:
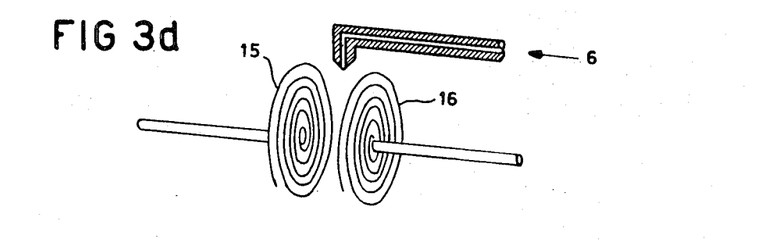

(3) Two plane wire electrodes 15 and 16 wound spirally with separate gas inlet (FIG. 3d). Only the electrode with gas inlet heats. This type of electrode functions essentially by capacitive effect.

The apparatus described below functions essentially by an inductive effect.

Figure 4A:
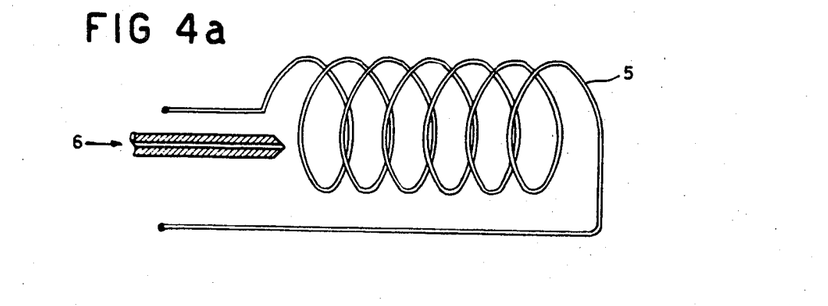

(4) A wound coil 5 with several turns through which the high-frequency current passes (FIG. 4a). This apparatus has already been described during the explanation of the principle of the invention.

Figure 4B:
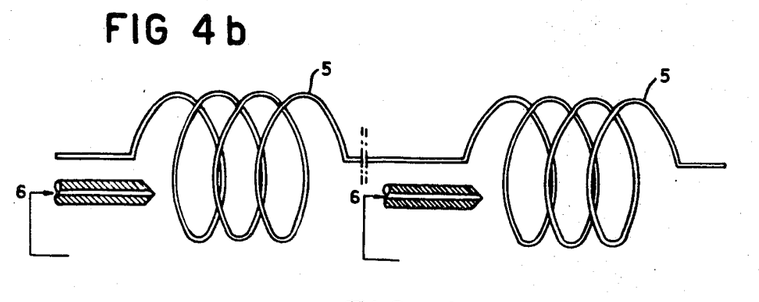
Figure 4C:
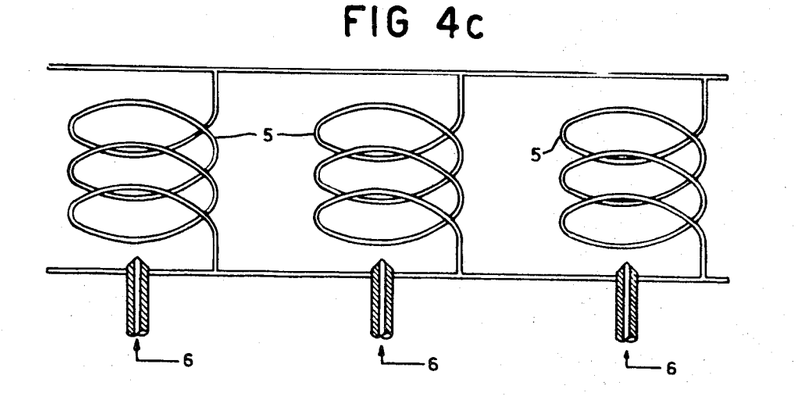
Figure 5:
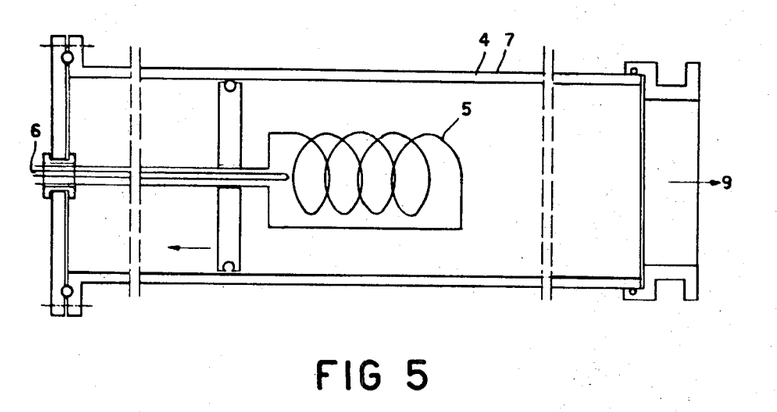
FIGS. 5 and 6 show two examples of the use of this invention for a device for depositing material on the inside of a tube (FIG. 5) or for coating a tank (FIG. 6).

The depositing capacity can be increased by using a combination of several inductance coils (FIGS. 4b and 4c). Apparatuses of this type are very efficient. They are very easily handled. They can be used advantageously, but not exclusively (other embodiments are equally valid for this purpose) to coat the insides of pipes, even those of large diameter. In such cases, the pipe itself could form the vacuum enclosure. All that is needed is to seal it, connect it to a vacuum-pump system and move the or each coil in it. FIG. 5 shows a device functioning on this principle. The insides of pressure tubes used in a nuclear reactor have been given non-corrosive deposits by this means in a very short time.

Figure 4D:
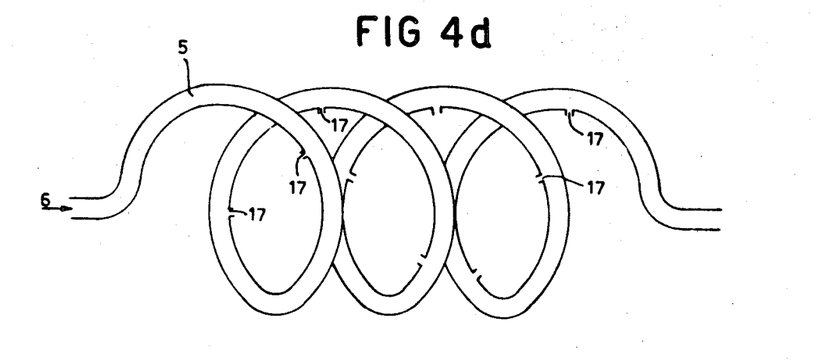

Inductance coils made of solid wire 2-3 mm. in diameter may for example be used; alternatively, in the case of metals with a low melting point, for example, hollow tubes cooled by a gas or liquid may be used. A tube can be coated with another metal (e.g. of lower melting point), for example a copper pipe coated externally with a layer of aluminium, the latter being the metal to be deposited in that case. The coil could also be made by winding a strip spirally; the purpose of this would be to increase the sputtering area and at the same time maintain good ionisation of the gas at the centre of the coil. To simplify the feeding of the ionising gas, the coil may be a tube of the material to be deposited, helically wound and formed with microapertures 17 (FIG. 4d) opening inwardly, which feed with ionising gas the interior of the space bounded by the coil (FIG. 4d).

Figure 4E:
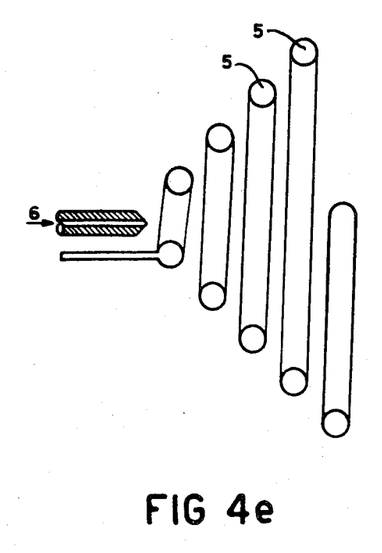
Figure 4F:
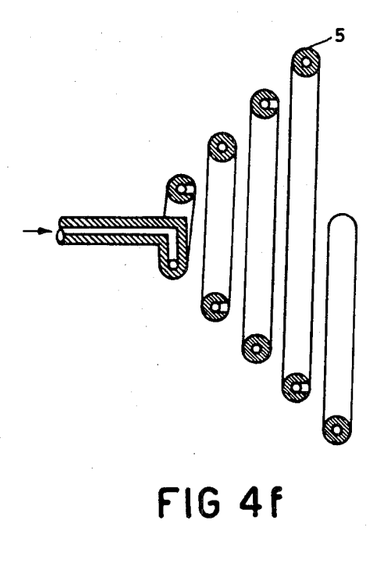
Figure 4G:
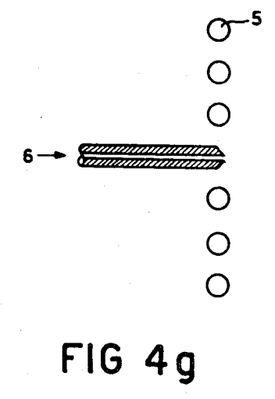

(5) An ionisation winding in the form of a "pancake" type substantially flat spiral. This spiral may be quite flat (FIGS. 4g and 4g') or slightly conical (FIGS. 4e and 4e') the opening of the cone pointing toward the article to be coated. The ionising gas may be introduced through the axis of the cone, or else a pipe may be used, the ionising gas issuing through the microapertures in the spiral (FIGS. 4f and 4f').

Figure 6:
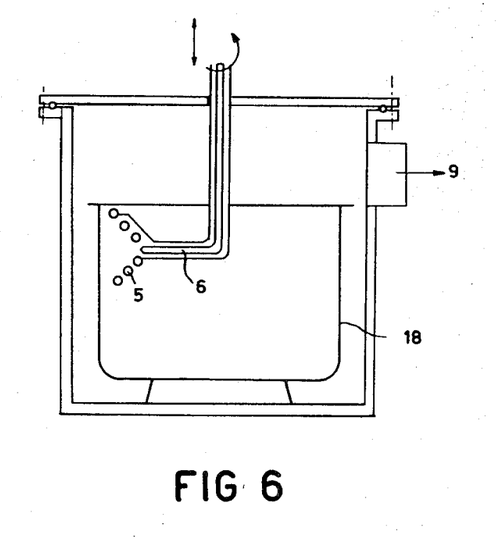

This device is particularly suitable for coating flat articles in the form of sheets, large cylinders or large tanks, for example (FIG. 6) a steel tank 18 which is to be used for chemical operations and has to be given a protective coat, for example of nickel. In such cases, a nickel, pancake-type coil would be used, and the tank would be rotated, in an enclosure subjected to an adequate vacuum. This is only one example among many.

Figure 4H:
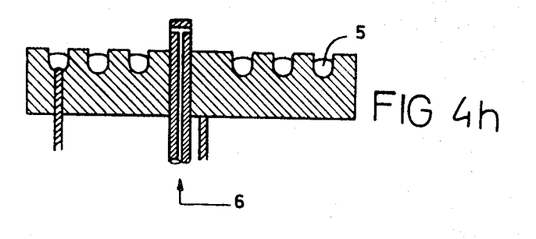

(6) For metals whose melting point is too low, or which have inadequate mechanical properties, the flat-spiral system is used, but this time made of liquid metals, supported by an appropriate ceramic support (FIGS. 4h and 4h') formed with a spiral groove containing the material to be projected. Argon gas is introduced through the axis of the spiral. This is particularly suitable for metals such as aluminium, zinc and cadmium, or their alloys with a low melting point.

As a result of the ionic bombardment caused by the high-frenquency field, the spiral or winding is heated and reaches various temperatures, but not above 1200° C. according to operating conditions. Local heating has been observed several times, especially if the gas jet approaches a turn too closely or is aimed directly at it. The turn may even be melted locally, impairing the satisfactory functioning of the operation. If the gas inlet is closed and the vacuum pump continues to work and removes the gases from the enclosure, it is found that the coil is cooled considerably. It is then no longer heated except through the high-frequency effect. This shows that the electrode is heated by the bombardment of the ions.

As a general principle, any conductive or semiconductive materials or compounds can be used for high-frequency windings. More generally, the means for the application of the high-frequency field can be made of any material to which a high-frequency electromagnetic field can be applied. Practically any materials that do not volatilise under the operational conditions described can be used as support materials. What has been said shows that the novel process has many advantages.

The process according to the invention deposits material more rapidly than conventional sputtering. Large-scale industrial operations can also be carried out.

The process does not require complicated equipment: a Roots pump and a rotary pump can produce the pressure of $10^{-2}$ to $10^{-3}$ mm. Hg required by the system. Auxiliary circulation of the gas, which would thus circulate in closed circuit, may also be provided. The electrical equipment is also very simple. A high-frequency generator, which has now become a very widely used instrument, is enough. Thanks to its simplicity and great flexibility in any vacuum enclosure, together with the small overall size of the depositing equipment, the process is suitable for many industrial uses, both nuclear and paranuclear. The inside of a pipe can be given a protective coat without any complications or modifications. The pipe, closed at one end and connected to a pump, can be used as a vacuum enclosure, or the pipe can be put in a very long cylindrical enclosure; it is preferable to rotate the pipe so that the material will be deposited homogeneously.

One of the advantages of the process according to the invention is that the depositing device can be controlled automatically so that the number of operations required is kept to the minimum. The efficiency is good, so that the raw material used is kept to the minimum. The simplicity of the process enables various chemical products or reagents to be dispensed with. Furthermore, before coating takes place, the surface to be coated can be cleaned in the same apparatus, greatly simplifying the process.

The process has a very wide field of application. It covers practically all industrial fields in which protective or decorative, conductive or semiconductive coats are needed. Some examples follow.

(a) In the chemical industry: acid-proof, corrosion-proof coats, etc.

(b) In the metallurgical industry: diffusion barriers, decorative or protective coats, coats to prevent hydrogen pick-up and protection against corrosive products.

(c) In the ceramic industry: metallic coats on ceramic articles for thermally or electrically conductive layers, or for base layers for welding.

(d) In the electronic industry: capacitor wires on ceramic material, plastics, glass or mica, printed circuits, circuits in semi-conductors, and junction, welding or protective layers.

(e) In the nuclear industry: diffusion barriers on fuels or shealths, protective layers against corrosion by water or organic products, diffusion barriers on reactor channels, protective layers on ceramics, linings of crucibles, for example tungsten on alumina for metallurgical fusion, conductive wires for special laboratory investigations, coated particles, layers on carbide or oxide spheres, coatings for thermionic conductors and thermionic fuel elements, and metallic coatings on $UO_2$, UC or the like. The alternating current circulating in any of the above-described means for applying the high-frequency field may, of course, be of any type, for example sinusoidal, sawtooth or in pulses.

We claim:

1. In a radio-frequency sputtering apparatus for depositing a thin layer of conductive or partially conductive material on a surface of a body which device comprises means for maintaining said surface in a low pressure gaseous atmosphere, means for feeding gas continuously to the atmosphere while maintaining the low pressure, an inductive coil comprised at least in a part of a material to be deposited within said low pressure atmosphere, means for applying a high-frequency voltage to said coil to produce a high-frequency electromagnetic field for confinement and ionization of the gas, means for mounting a surface external to said coil, the improvement wherein the means for mounting said surface and the gas feeding means are both positioned adjacent said coil and the gas is fed into the interior of the space defined by the coil.

2. A device as claimed in claim 1 in which the pressure external to the coil is about $10^{-1}$ to $10^{-3}$ mm. Hg.

3. A device as claimed in claim 1 further comprising means to cool said coil by passing heat-carrying fluid through the mass thereof.

4. A device as claimed in claim 1 further comprising a conductive core having a coating of the material to be deposited, said core having a higher melting point than said material.

5. A device as claimed in claim 1 further comprising a horizontally disposed plate of non-conductive refractory material having a spiral groove therein, said material to be deposited being liquid at the operating temperature and being initially in said groove thereby comprising said at least part of said inductive coil.

6. A device as claimed in claim 5 in which the gas is admitted at the center of the spiral.

7. In a radio-frequency sputtering apparatus for depositing a thin layer of conductive or partially conductive material on a surface of a body which device comprises means for maintaining said surface in a low pressure gaseous atmosphere, means for feeding gas continuously to the atmosphere while maintaining the low pressure, an electrode pair comprised at least in a part of a material to be deposited within said low pressure atmosphere, means for applying a high-frequency voltage to said electrode pair to produce a high-frequency electromagnetic field for confinement and ionization of the gas, means for mounting a surface external to said electrode pair, the improvement wherein the means for mounting said surface and the gas feeding means are both positioned adjacent said electrode pair and the gas is fed into the interior of the space defined by the electrode pair.

8. A device as claimed in claim 7, in which the pressure external to the electrode pair is about $10^{-1}$ to $10^{-3}$ mm. Hg.

9. A device as claimed in claim 7 further comprising means to cool said electrode pair by passing heat-carrying fluid through the mass thereof.

10. A device as claimed in claim 7, further comprising a conductive core having a coating of the material to be deposited, said core having a higher melting point than said material.

References Cited

UNITED STATES PATENTS

| | | | |
|---|---|---|---|
| 2,069,835 | 2/1937 | Keller | 204—298 |
| 2,100,045 | 11/1937 | Alexander | 204—192 |
| 2,148,045 | 2/1939 | Burkhardt et al. | 204—192 |
| 2,920,002 | 1/1960 | Auwarter | 204—298 |
| 3,250,694 | 5/1966 | Maissel et al. | 204—298 |
| 3,386,909 | 6/1968 | Hough | 204—192 |

JOHN H. MACK, Primary Examiner

S. S. KANTER, Assistant Examiner